US012789458B2

(12) United States Patent
Hsu et al.

(10) Patent No.: US 12,789,458 B2
(45) Date of Patent: Nov. 10, 2026

(54) THREE-DIMENSIONAL PRINTING DEVICE, LIGHT CONTROL MODULE AND OPERATION METHOD OF THREE-DIMENSIONAL PRINTING DEVICE

(71) Applicant: Innolux Corporation, Miaoli County (TW)

(72) Inventors: Chieh-Hsiang Hsu, Miaoli County (TW); Tsung-Che Lu, Miaoli County (TW); Chiu-Ju Chu, Miaoli County (TW); Chang-Heng Tsai, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 114 days.

(21) Appl. No.: 18/348,378

(22) Filed: Jul. 7, 2023

(65) Prior Publication Data

US 2024/0051224 A1 Feb. 15, 2024

Related U.S. Application Data

(60) Provisional application No. 63/397,389, filed on Aug. 12, 2022.

(30) Foreign Application Priority Data

May 11, 2023 (CN) ........................ 202310529945.1

(51) Int. Cl.
*B29C 64/264* (2017.01)
*B29C 64/129* (2017.01)
(Continued)

(52) U.S. Cl.
CPC .......... *B29C 64/264* (2017.08); *B29C 64/129* (2017.08); *B33Y 10/00* (2014.12);
(Continued)

(58) Field of Classification Search
CPC ... B29C 64/129; B29C 64/264; B29C 64/135; B29C 64/268; B29C 64/273;
(Continued)

(56) References Cited

U.S. PATENT DOCUMENTS

2019/0310507 A1* 10/2019 Yamada ............ G02F 1/133528
2019/0369292 A1* 12/2019 Seo ...................... H10K 59/878
(Continued)

FOREIGN PATENT DOCUMENTS

CN 110750019 2/2020
CN 113552746 10/2021
CN 113703085 11/2021

*Primary Examiner* — Philip C Tucker
*Assistant Examiner* — Jimmy R Smith, Jr.
(74) *Attorney, Agent, or Firm* — JCIPRNET

(57) ABSTRACT

A light control module including a first substrate, a second substrate, a medium layer, a polarizing element and an electrical connection element is provided. The first substrate has an outer surface and an inner surface opposite to the outer surface. The second substrate is opposite to the first substrate. The medium layer is disposed between the inner surface of the first substrate and the second substrate. The polarizing element is disposed on the outer surface of the first substrate and includes an adhesive layer. The electrical connection element is at least partially disposed on the outer surface of the first substrate and connected to the adhesive layer. A three-dimensional printing device and an operation method thereof are also provided.

20 Claims, 7 Drawing Sheets

(51) Int. Cl.
*B33Y 10/00* (2015.01)
*B33Y 30/00* (2015.01)
*G02F 1/1335* (2006.01)

(52) U.S. Cl.
CPC ........ *B33Y 30/00* (2014.12); *G02F 1/133528* (2013.01); *G02F 2202/28* (2013.01)

(58) Field of Classification Search
CPC ... B29C 64/277; B29C 64/282; B29C 64/286; B29C 64/291; B29C 71/04; B33Y 30/00; G02F 1/133528; G02F 2202/28; G02F 1/133531; G02F 1/133538
See application file for complete search history.

(56) References Cited

U.S. PATENT DOCUMENTS

2023/0150200 A1* 5/2023 Goldman .......... G02F 1/133528
264/494
2023/0292563 A1* 9/2023 Park ..................... H10K 59/873

* cited by examiner

THREE-DIMENSIONAL PRINTING DEVICE, LIGHT CONTROL MODULE AND OPERATION METHOD OF THREE-DIMENSIONAL PRINTING DEVICE

CROSS-REFERENCE TO RELATED APPLICATION

This application claims the priority benefit of the U.S. provisional application Ser. No. 63/397,389, filed on Aug. 12, 2022, and China application serial no. 202310529945.1, filed on May 11, 2023. The entirety of each of the above-mentioned patent applications is hereby incorporated by reference herein and made a part of this specification.

BACKGROUND

Technical Field

The disclosure relates to a three-dimensional printing device, a light control module and an operation method of the three-dimensional printing device.

Description of Related Art

A three-dimensional (3D) printing device may use a light control module as a mask, and electronically modulates a mask opening in the light control module that allows ultra-violet light to pass through, thereby curing a light-curable material in an accommodating tank. In order to improve a precision of 3D printing, the light control module must be developed towards high resolution. However, a transmittance of the light control module decreases as the resolution increases, resulting in a risk of underexposure.

SUMMARY

The disclosure is directed to three-dimensional (3D) printing device, a light control module and an operation method of the three-dimensional printing device, which helps to improve a transmittance of the light control module.

An embodiment of the disclosure provides a light control module including a first substrate, a second substrate, a medium layer, a polarizing element and an electrical connection element. The first substrate has an outer surface and an inner surface opposite to the outer surface. The second substrate is opposite to the first substrate. The medium layer is disposed between the inner surface of the first substrate and the second substrate. The polarizing element is disposed on the outer surface of the first substrate and includes an adhesive layer. The electrical connection element is at least partially disposed on the outer surface of the first substrate and connected to the adhesive layer.

Another embodiment to of the disclosure provides a three-dimensional printing device including the aforementioned light control module, a light source module, and an accommodating tank, wherein the light control module is disposed between the light source module and the accommodating tank. The light source module is configured to provide a light beam to the light control module. The accommodating tank is configured to accommodate the light-curable material, and the light-curable material is cured by the light beam.

Another embodiment to of the disclosure provides an operation method of the 3D printing device including following steps: providing the aforementioned 3D printing device; configuring a light-curable material in the accommodating tank; enabling the light source module to provide a light beam; enabling the light control module to provide a first light-transmitting region and a first light-blocking region; enabling the light beam to pass through the first light-transmitting region of the light control module; and curing a first part of the light-curable material corresponding to the first light-transmitting region into a first cured layer by the light beam.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
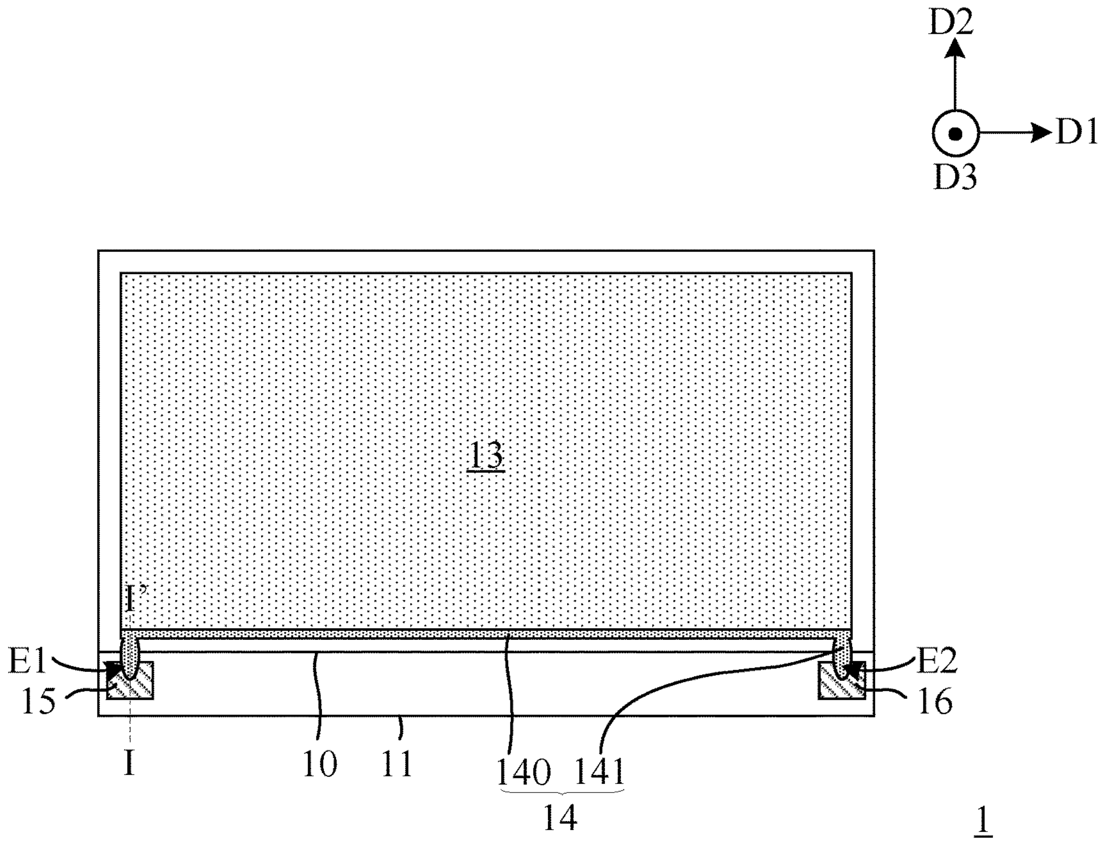
FIG. 1 and FIG. 4 are respectively schematic top views of multiple light control modules according to multiple embodiments of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Certain terms are used throughout the specification of the disclosure and the appended claims to refer to specific components. Those skilled in the art should understand that electronic device manufacturers may probably use different names to refer to the same components. This specification is not intended to distinguish between components that have the same function but different names. In the following specification and claims, the terms "including", "containing", etc., are open terms, so that they should be interpreted as meaning of "including but not limited to . . . ".

Directional terminology mentioned in the following embodiments, such as "top," "bottom," "left," "right," "front," "back," etc., is used with reference to the orientation of the FIG(s) being described and are not intended to limit the disclosure. In the FIGs, each of the drawings depicts typical features of methods, structures, and/or materials used in the particular exemplary embodiments. However, these drawings are not to be interpreted as limiting or limiting the scope or property covered by these exemplary embodiments. For example, for clarity's sake, relative thickness and position of each film layer, region and/or structure may be reduced or enlarged.

A structure (or layer, element, substrate) described in the disclosure is located on/over another structure (or layer, element, substrate), which may mean that the two structures are adjacent and directly connected, or it may mean that the two structures are adjacent and are not directly connected. Indirect connection means that there is at least one intermediate structure (or intermediate layer, intermediate element, intermediate substrate, intermediate space) between the two structures, a lower surface of one structure is adjacent to or directly connected to an upper surface of an intermediate structure, and an upper surface of the other structure is adjacent to or directly connected to a lower surface of the intermediate structure. The intermediate structure may be composed of a single-layer or multi-layer physical structure or a non-physical structure, which is not limited by the disclosure. In the disclosure, when a certain structure is set "on" another structure, it may probably mean that the certain structure is "directly" on the another structure, or that the certain structure is "indirectly" on the another structure, i.e., there is at least one structure clamped between the certain structure and the another structure.

The terms "about", "equal to", "equal" or "identical", "substantially" or "substantially" are generally interpreted as being within 20% of a given value or range, or as being within 10%, 5%, 3%, 2%, 1%, or 0.5% of the given value or range. In addition, phrases "a range is from a first value to a second value" and "the range is between the first value to the second value" mean that the range includes the first value, the second value and other values there between.

Ordinal numbers such as "first", "second" and the like used in the specification and claims are used to modify elements, which do not imply and represent that the (or these) elements have any previous ordinal numbers, nor does it represent an order of one element with another element, or an order of a manufacturing process, and the use of these ordinal numbers is only to clearly distinguish the element with a certain name from another element with the same name. The same words may not be used in the claims and the specification. Accordingly, a first component in the specification may be a second component in the claims.

The electrical connection or coupling described in the disclosure may refer to direct connection or indirect connection. In the case of direct connection, terminals of components on two circuits are directly connected or connected to each other with a conductor line segment, and in the case of indirect connection, there are switches, diodes, capacitors, inductors, resistors, other suitable components, or a combination of the above components between the terminals of the components on the two circuits, but the disclosure is not limited thereto.

In the disclosure, thickness, length and width may be measured by optical microscope (OM), and thickness or width may be obtained through measurement of a cross-sectional image in electron microscope, but the disclosure is not limited thereto. In addition, there may be some error in any two values or directions used for comparison. In addition, the terms "equivalent", "equal", "identical", "substantially", or "roughly" mentioned in the disclosure generally represent falling within 10% of a given value or range. In addition, a phrase "a given range is from a first value to a second value", "the given range falls within a range of the first value to the second value", or "the given range is between the first value to the second value" indicates that the given range includes the first value, the second value, and other values there between. If the first direction is perpendicular to the second direction, an angle between the first direction and the second direction may be between 80 degrees and 100 degrees; and if the first direction is parallel to the second direction, the angle between the first direction and the second direction may be between 0 and 10 degrees.

It should be noted that the following embodiments may replace, reorganize, and mix features from several different embodiments to complete other embodiments without departing from the spirit of the disclosure. The features between each embodiment may be freely mixed and used as long as they do not violate the spirit of the disclosure or conflict with each other.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the disclosure, an electronic device may include a three-dimensional (3D) printing device, a display device, a back light device, an antenna device, a sensing device, or a splicing device, but the disclosure is not limited thereto. The electronic device may be bent or flexible. The 3D printing device may be a printing device that uses a stereo lithography technology, a digital light processing (DLP) technology, or a liquid crystal display (LCD) light curing technology. The display device may be a non-self-luminous display device or a self-luminous display device. The backlight device may, for example, include liquid crystal, light emitting diode, fluorescence, phosphor, quantum dots (QD), other suitable display media, or a combination thereof. The antenna device may include, for example, a frequency selective surface (FSS), a radio frequency filter (RF-filter), a polarizer, a resonator, or an antenna, etc. The antenna may be a liquid crystal type antenna or a non-liquid crystal type antenna. The sensing device may be a sensing device for sensing capacitance, light, heat or ultrasonic, but the disclosure is not limited thereto. In the disclosure, the electronic device may include electronic components, and the electronic components may include passive components and active components, such as capacitors, resistors, inductors, diodes, transistors, etc. The diodes may include light emitting diodes or photodiodes. The light emitting diodes may, for example, include organic light emitting diodes (OLEDs), mini LEDs, micro LEDs or quantum dot LEDs, but the disclosure is not limited thereto. The splicing device may be, for example, a display splicing device or an antenna splicing device, but the disclosure is not limited thereto. It should be noted that the electronic device may be any permutation and combination of the aforementioned devices, but the disclosure is not limited thereto. In addition, a shape of the electronic device may be rectangular, circular, polygonal, shapes with curved edges, or other suitable shapes. The electronic device may have a peripheral system such as a driving system, a control system, a light source system, etc., to support a display device, an antenna device, a wearable device (including augmented reality or virtual reality), an in-vehicle device (including a car windshield), or a splicing device.

Figure 2:
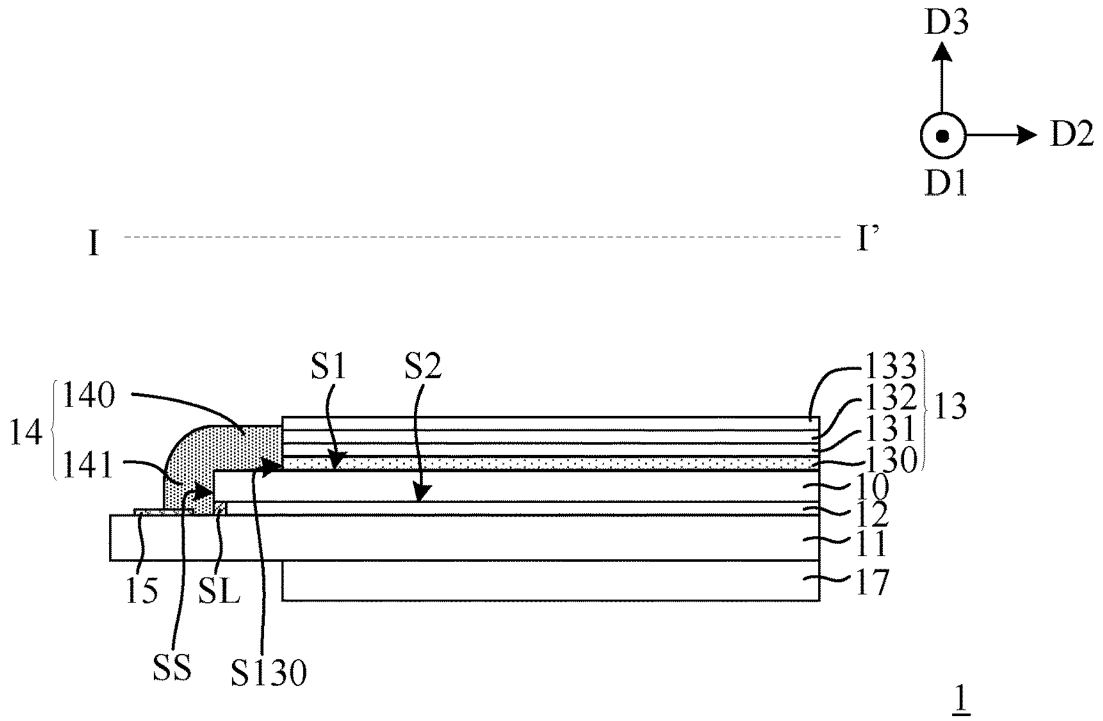
FIG. 2 is a schematic cross-sectional view of FIG. 1 along a section line I-I'.
Figure 3:
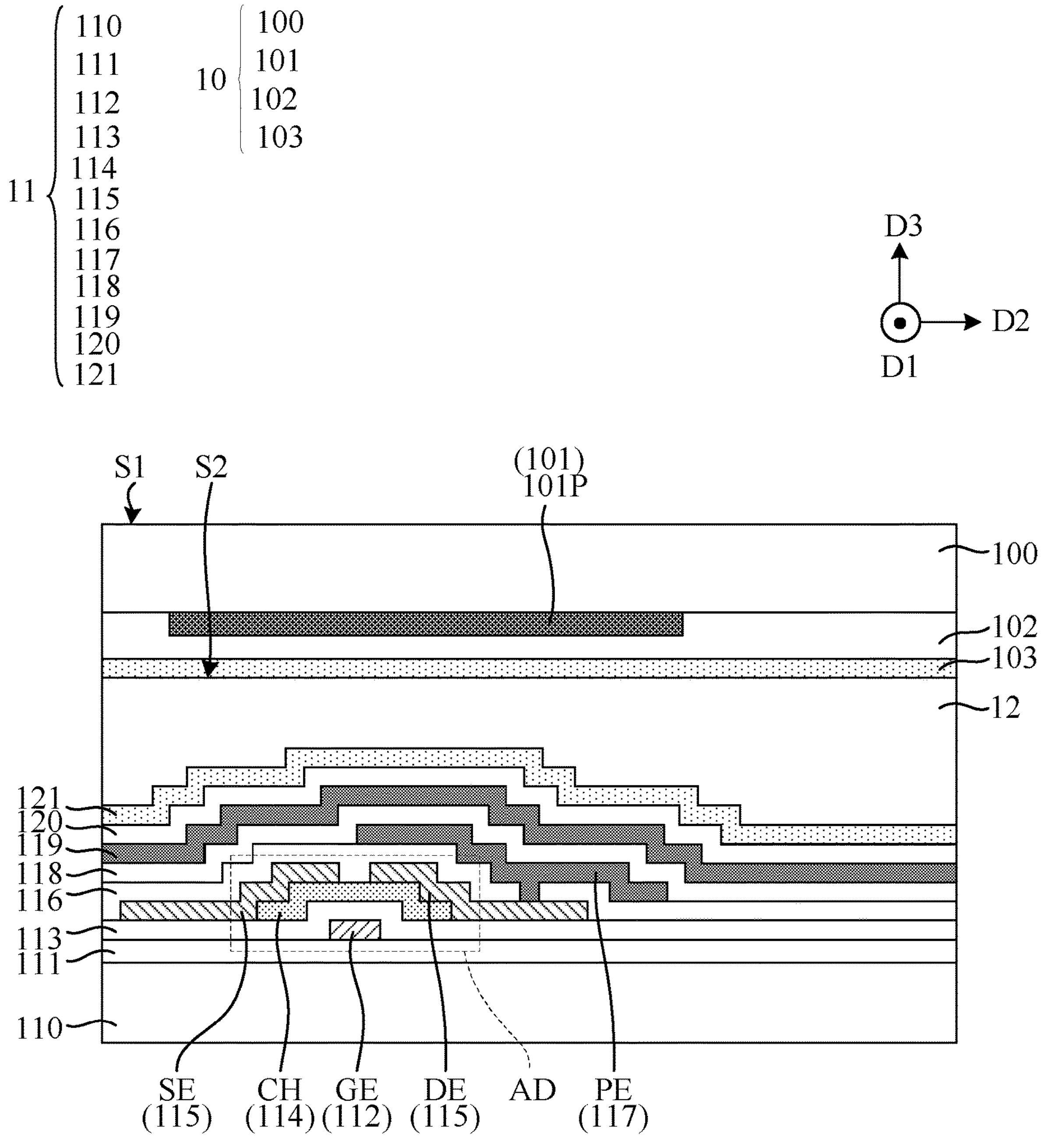
FIG. 3 is a schematic partial enlarged view of a first substrate, a second substrate, and a medium layer in FIG. 2.
Figure 4:
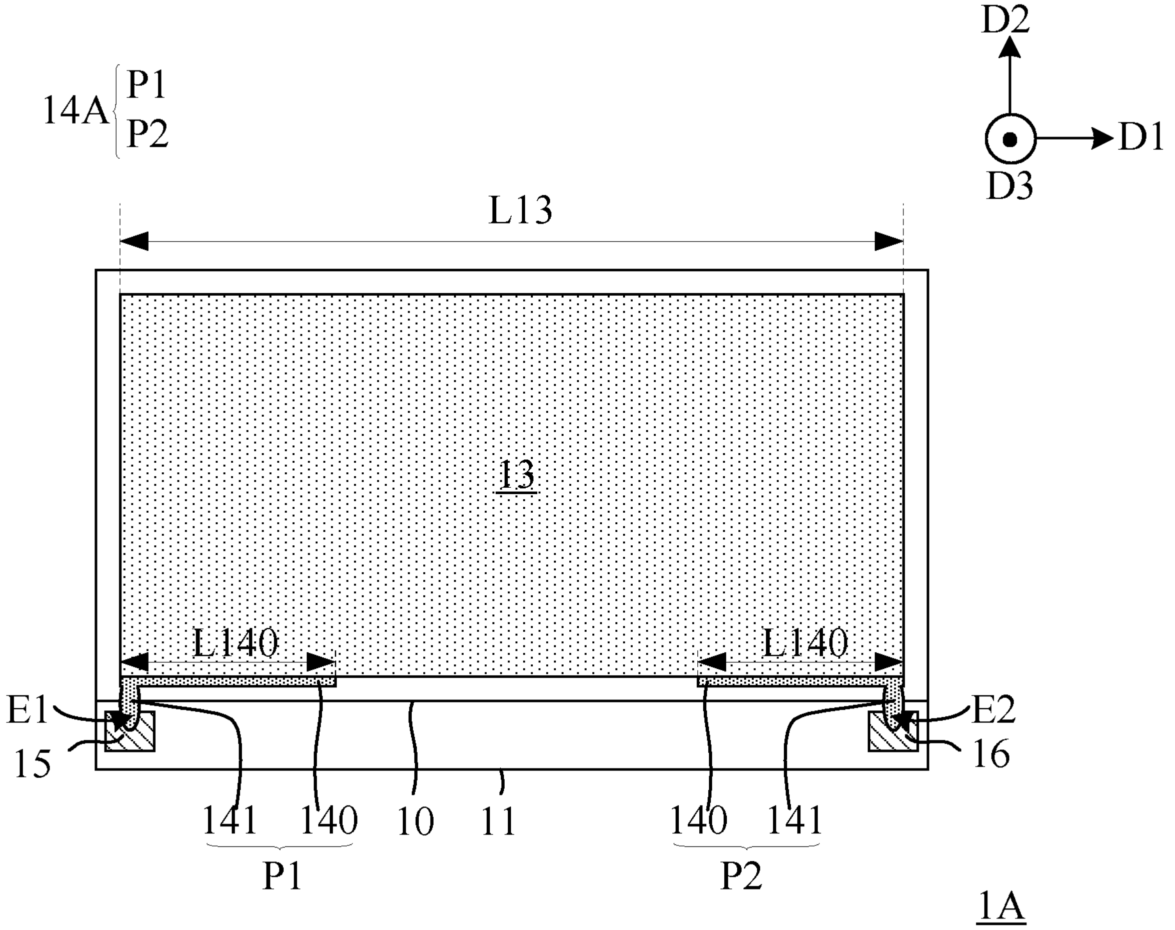
Figure 5A:
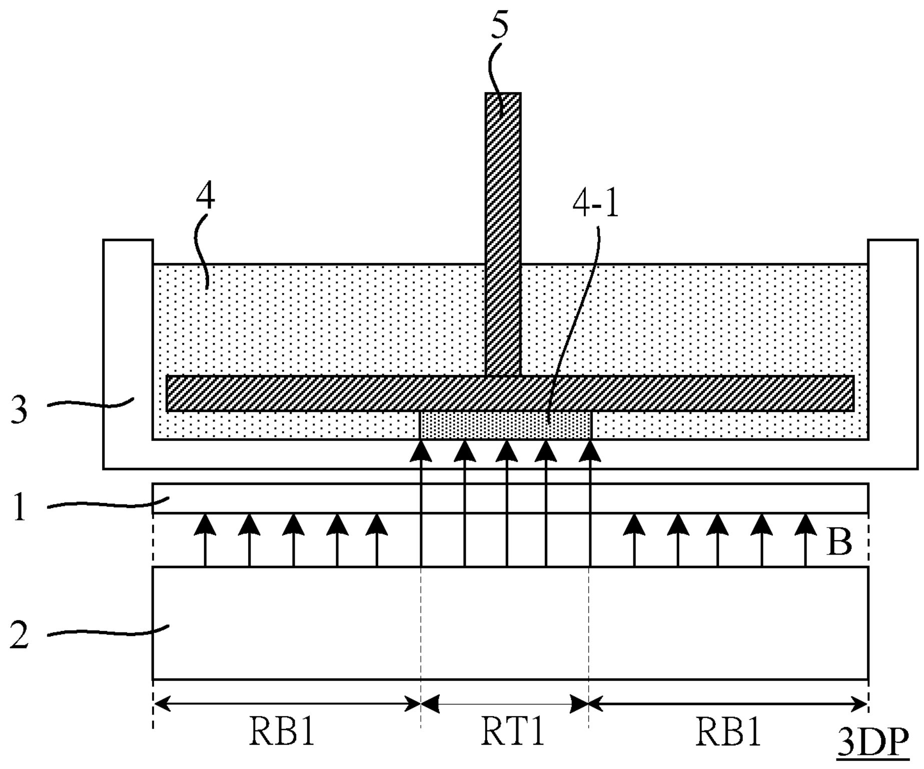
FIG. 5A, FIG. 6A and FIG. 7A are respectively flowcharts of an operation method of a 3D printing device according to an embodiment of the disclosure.
Figure 5B:
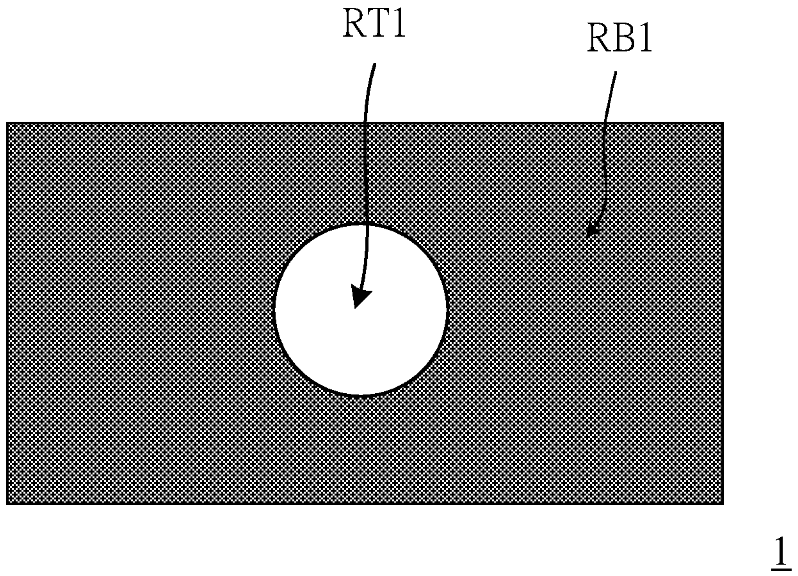
FIG. 5B, FIG. 6B, and FIG. 7B are respectively schematic top views of display images of the light control module in FIG. 5A, FIG. 6A, and FIG. 7A.
Figure 6A:
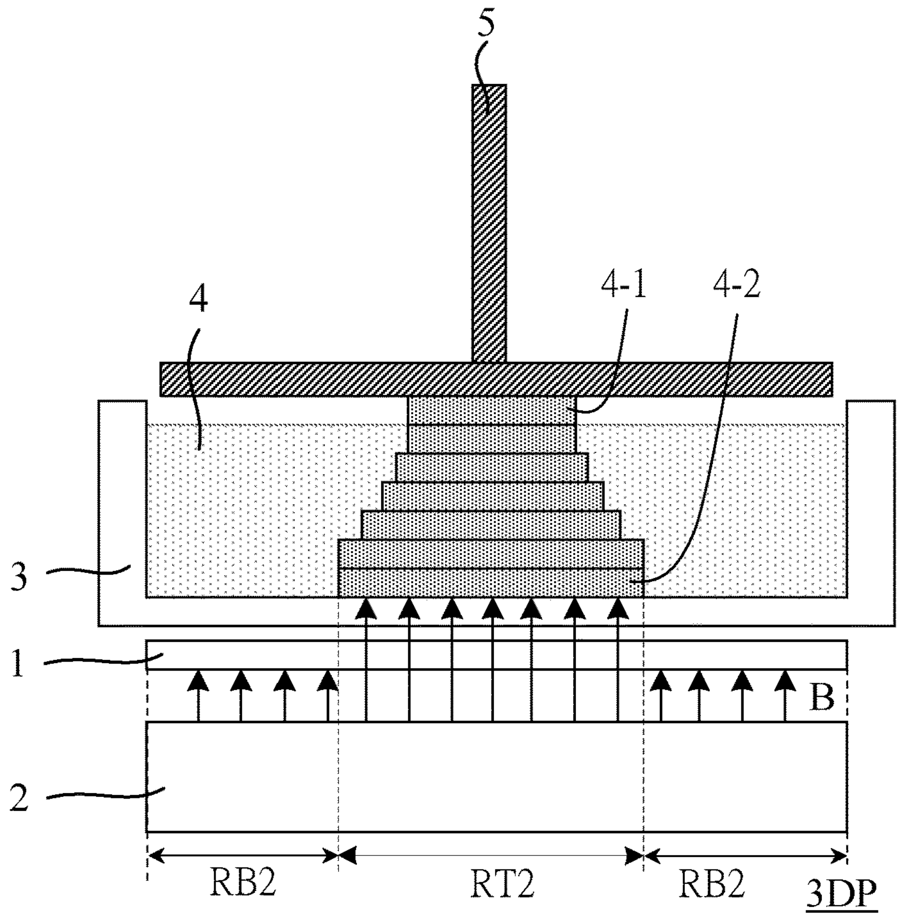
Figure 6B:
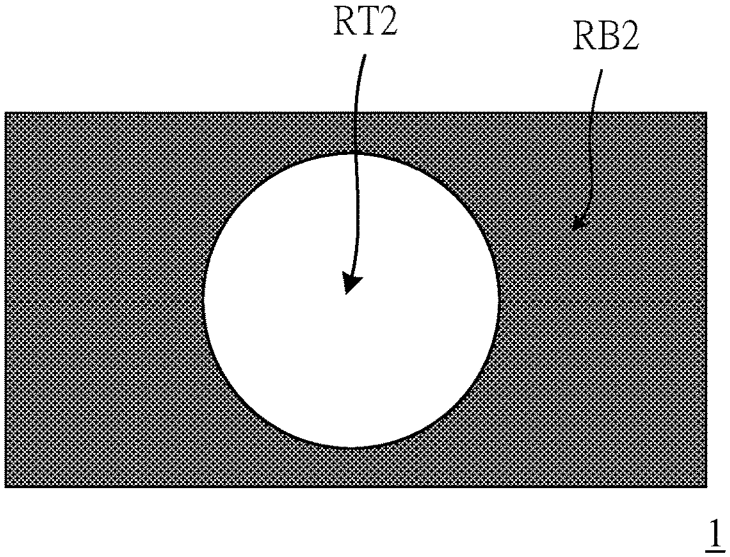
Figure 7A:
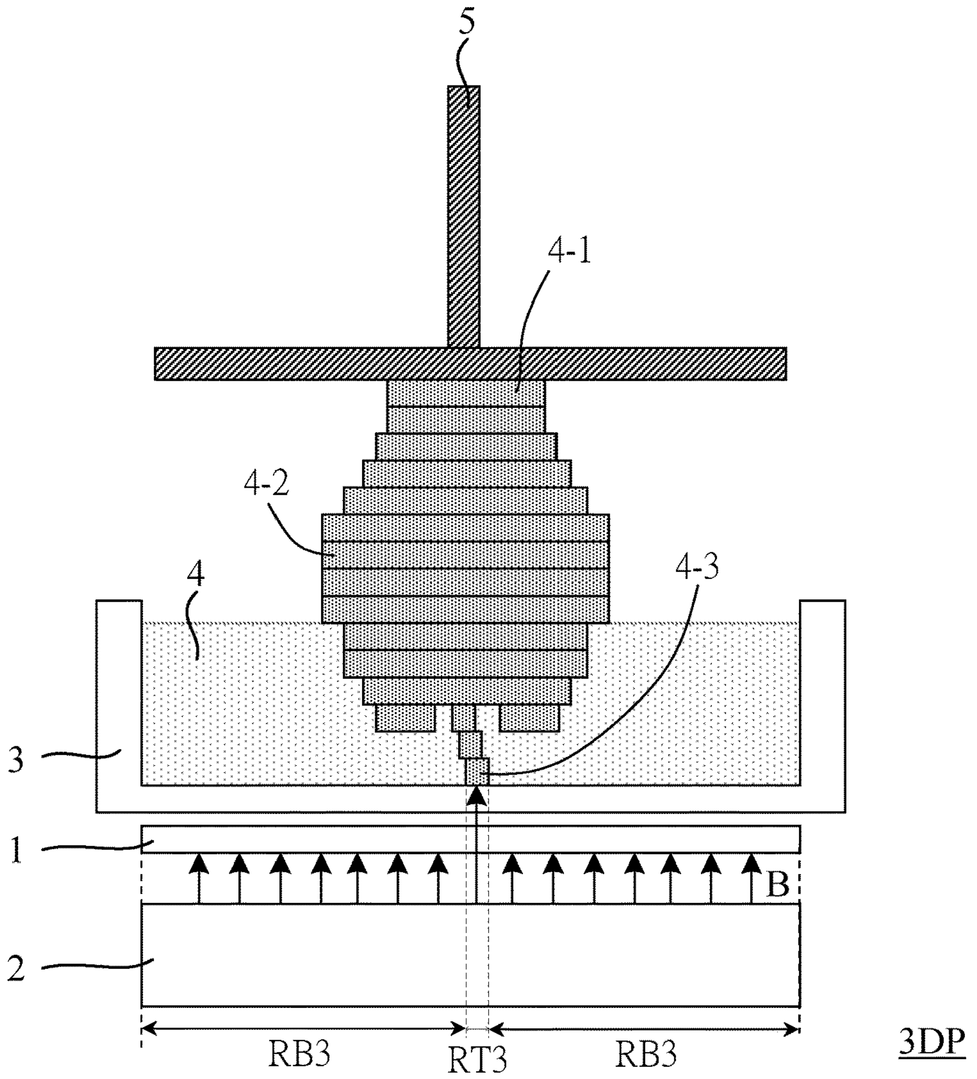
Figure 7B:
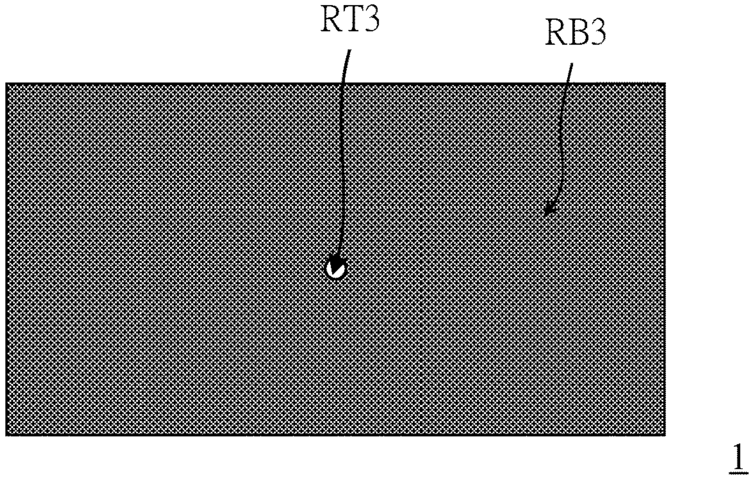
Figure 8:
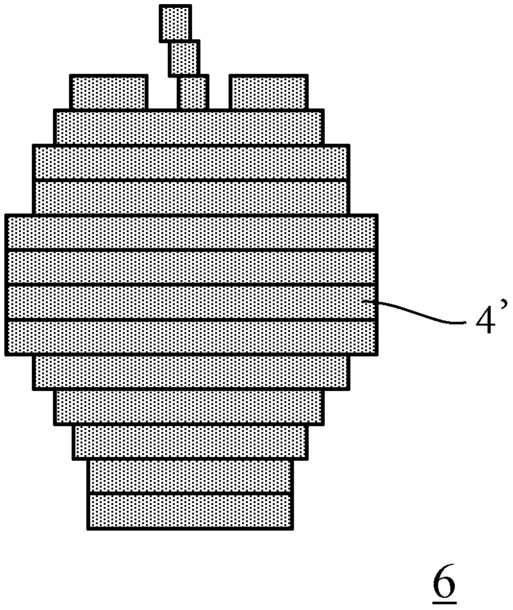
FIG. 8 is a schematic diagram of an item produced by 3D printing.

FIG. 1 and FIG. 4 are respectively schematic top views of multiple light control modules according to multiple embodiments of the disclosure. FIG. 2 is a schematic cross-sectional view of FIG. 1 along a section line I-I'. FIG. 3 is a schematic partial enlarged view of a first substrate, a second substrate, and a medium layer in FIG. 2. FIG. 5A, FIG. 6A and FIG. 7A are respectively flowcharts of an operation method of a 3D printing device according to an embodiment of the disclosure. FIG. 5B, FIG. 6B, and FIG. 7B are respectively schematic top views of display images of the light control module in FIG. 5A, FIG. 6A, and FIG. 7A. FIG. 8 is a schematic diagram of an item produced by 3D printing.

Referring to FIG. 1 to FIG. 3, a light control module 1 may include a first substrate 10, a second substrate 11, a medium layer 12, a polarizing element 13, and an electrical connection element 14. The first substrate 10 has an outer surface S1 and an inner surface S2 opposite to the outer surface S1. The second substrate 11 is disposed opposite to the first substrate 10. The medium layer 12 is disposed between the inner surface S2 of the first substrate 10 and the second substrate 11. The polarizing element 13 is disposed on the outer surface S1 of the first substrate and includes an adhesive layer 130. The electrical connection element 14 is at least partially disposed on the outer surface S1 of the first substrate 10 and connected to the adhesive layer 130.

In some embodiments, the second substrate 11, the first substrate 10, and the medium layer 12 may be an element array substrate, an opposite substrate, and a liquid crystal layer, respectively, but the disclosure is not limited thereto.

Taking an active device array substrate as an example, the second substrate 11 may include, but is not limited to, a carrier board 110, an insulating layer 111, a conductive layer 112, an insulating layer 113, semiconductor layer 114, a conductive layer 115, an insulating layer 116, a conductive layer 117, an insulating layer 118, a conductive layer 119, an insulating layer 120, and an alignment layer 121, but the disclosure is not limited thereto.

The carrier board 110 may be a rigid substrate or a flexible substrate. A material of the carrier board 110 include, for example, glass, quartz, ceramics, sapphire or plastic, but the disclosure is not limited thereto. The plastic may include polycarbonate (PC), polyimide (PI), polypropylene (PP), polyethylene terephthalate (PET), other suitable flexible materials or combinations of the aforementioned materials, but the disclosure is not limited thereto.

As shown in FIG. 3, the insulating layer 111 is disposed on the carrier board 110. A material of the insulating layer 111 include, for example, an organic insulation material, an inorganic insulation material, or a combination thereof. The organic insulation material includes, for example, polymethyl methacrylate (PMMA), epoxy resin, acrylic-based resin, silicone, polyimide polymer, or combinations thereof, but the disclosure is not limited thereto. The inorganic insulating material includes, for example, silicon oxide or silicon nitride, but the disclosure is not limited thereto.

The conductive layer 112 is disposed on the buffer layer 111. A material of the conductive layer 112 include, for example, metal or metal laminations, such as aluminum, molybdenum, or titanium/aluminum/titanium, but the disclosure is not limited thereto. The conductive layer 112 may be a patterned conductive layer, and the conductive layer 112 may include multiple gate electrodes GE (one is schematically shown), multiple scan lines (not shown), and other lines (not shown), but the disclosure is not limited thereto.

The insulating layer 113 is disposed on the conductive layer 112 and the buffer layer 111. For a material of the insulating layer 113, reference may be made to the material of the insulating layer 111, which will not be repeated here.

The semiconductor layer 114 is disposed on the insulating layer 113. A material of the semiconductor layer 114 includes amorphous silicon, polysilicon, or metal oxide, but the disclosure is not limited thereto. The metal oxide may include indium gallium zinc oxide (IGZO), but the disclosure is not limited thereto. The semiconductor layer 114 is, for example, a patterned semiconductor layer and may include multiple semiconductor patterns CH (only one is schematically shown). Multiple semiconductor patterns CH are respectively disposed corresponding to multiple gate electrodes GE, for example, each semiconductor pattern CH at least partially overlaps with a corresponding gate electrode GE in a thickness direction (such as a direction D3) of the light control module 1.

As shown in FIG. 3, the conductive layer 115 is disposed on the semiconductor layer 114 and the insulating layer 113. For a material of the conductive layer 115, reference may be made to the material of the conductive layer 112, which will not be repeated here. The conductive layer 115 may be a patterned conductive layer, and the conductive layer 115 may include multiple source electrodes SE (one is schematically shown), multiple drain electrodes DE (one is schematically shown), multiple data lines (not shown), and other lines (not shown), but the disclosure is not limited thereto. Each source electrode SE and the corresponding drain electrode DE are respectively located on two opposite sides of the corresponding semiconductor pattern CH. In addition, the second substrate 11 may include multiple active devices AD (one is schematically illustrated), and multiple active devices AD may be arranged in an array on a plane formed by a direction D1 and a direction D2. As shown in FIG. 1, the direction D1 may be a direction of a first side edge of a carrier board in the first substrate 10 (or a carrier board in the second substrate 11), the direction D2 may be a direction of a second side edge of a carrier board in the first substrate (or a carrier board in the second substrate 11), and the first side edge is connected to the second side edge. The direction D1 and the direction D2 may be different, for example, the direction D1 and the direction D2 may be perpendicular with each other, but the disclosure is not limited thereto. Each active device AD includes, for example, a gate electrode GE, a semiconductor pattern CH, a drain electrode DE and a source electrode SE, but the disclosure is not limited thereto. Although FIG. 3 schematically shows the active device AD of a bottom-gate type thin-film transistor, i.e., the gate electrode GE is below the semiconductor layer 114. But it should be understood that the type of the active device AD is not limited, i.e., the active device AD may be any type of active device. According to some embodiments, the gate electrode GE may be disposed above the semiconductor layer 114.

The insulating layer 116 is disposed on the conductive layer 115, the semiconductor layer 114 and the insulating layer 113. For a material of the insulating layer 116, reference may be made to the material of the insulating layer 111, which will not be repeated here.

As shown in FIG. 3, the conductive layer 117 is disposed on the insulating layer 116. A material of the conductive layer 115 includes, for example, a transparent conductive material. The transparent conductive material may include metal oxide, graphene, other suitable transparent conductive materials, or combinations thereof. The metal oxide may include indium tin oxide (ITO), indium zinc oxide, aluminum tin oxide, aluminum zinc oxide, indium germanium zinc oxide or other metal oxides. The conductive layer 117 may be a patterned conductive layer, and the conductive layer 117 may include multiple pixel electrodes PE (one is schematically shown) and other lines (not shown), but the disclosure is not limited thereto. Each pixel electrode PE may penetrate through the insulating layer 116 and may be electrically connected with a corresponding drain electrode DE. Multiple pixel electrodes PE may be arranged in an array, and the pixel electrodes PE may be electrically connected with the corresponding active devices AD.

The insulating layer 118 is disposed on the conductive layer 117 and the insulating layer 116. For a material of the insulating layer 118, reference may be made to the material of the insulating layer 111, which will not be repeated here.

The conductive layer 119 is disposed on the insulating layer 118. For a material of the conductive layer 119, reference may be made to the material of the conductive layer 117, which will not be repeated here. The conductive layer 119 may be a common electrode layer, but the disclosure is not limited thereto. As shown in FIG. 3, the common electrode layer (conductive layer 119) is disposed above the pixel electrode PE, but the disclosure is not limited thereto. According to some embodiments, the common electrode layer (conductive layer 119) may be disposed under the pixel electrode PE. According to some embodiments, the common electrode layer (conductive layer 119) may have a slit. According to some embodiments, the pixel electrode PE may have a slit.

The insulating layer 120 is disposed on the conductive layer 119. For a material of the insulating layer 120, reference may be made to the material of the insulating layer 111, which will not be repeated here.

The alignment layer 121 is disposed on the insulating layer 120 and located between the insulating layer 120 and the medium layer 12. A material of the alignment layer 121 includes, for example, polyimide, but the disclosure is not limited thereto.

The first substrate 10 is overlapped with the second substrate 11 in the thickness direction (such as the direction D3) of the light control module 1. In some embodiments, the first substrate 10 may be bonded with the second substrate 11 through a sealant SL (referring to FIG. 2), and the first substrate 10, the second substrate 11 and the sealant SL may enclose a sealing space containing the medium layer 12, but the disclosure is not limited thereto.

As shown in FIG. 3, the first substrate 10 may include a carrier board 100, a light-blocking layer 101, an insulating layer 102, and an alignment layer 103, but the disclosure is not limited thereto.

The carrier board 100 may be a rigid substrate or a flexible substrate. For a material of the carrier board 100, reference may be made to the material of the carrier board 110, which will not be repeated here.

The light-blocking layer 101 is disposed on a surface of the carrier board 100 facing the medium layer 12. A material of the light-blocking layer 101 may include a light-absorbing material, such as a black matrix, but the disclosure is not limited thereto. The light-blocking layer 101 may be a patterned light-blocking layer, and the light-blocking layer 101 may include multiple light-blocking patterns 101P (one is schematically shown). Multiple light-blocking patterns 101P may be disposed corresponding to multiple active devices AD, multiple scan lines, multiple signal lines or other lines. According to some embodiments, in the thickness direction (such as the direction D3) of the light control module 1, multiple light-blocking patterns 101P may be overlapped with multiple active devices AD. Namely, the light-blocking pattern 101P and the corresponding active device AD may be at least partially overlapped. According to some embodiments, in the thickness direction D3 of the light control module 1, the light-blocking pattern 101P may be overlapped with at least a part of the scan line. According to some embodiments, in the thickness direction D3 of the light control module 1, the light-blocking pattern 101P may be overlapped with at least a part of the signal line or other lines. The thickness direction D3 of the light control module 1 may be a thickness direction of the carrier board 100 or the carrier board 110.

The insulating layer 102 is disposed on the light-blocking layer 101 and the carrier board 100. For a material of the insulating layer 102, reference may be made to the material of the insulating layer 111, which will not be repeated here.

The alignment layer 103 is disposed on the insulating layer 102 and located between the insulating layer 102 and the medium layer 12. For a material of the alignment layer 103, reference may be made to the material of the alignment layer 121, which will not be repeated here.

It should be understood that FIG. 3 is only an example of the second substrate 11, the first substrate 10 and the medium layer 12. A composition of each of the second substrate 11, the first substrate 10, and the medium layer 12 or a relative arrangement relationship between the film layers may be changed according to actual needs, and is not limited to that shown in FIG. 3. For example, although not shown, the conductive layer 119 may be disposed in the first substrate 10, i.e., the conductive layer 119 may be disposed on the carrier board 100, for example, in other non-illustrated embodiments, the second substrate 11 may omit the conductive layer 119 and the insulating layer 120, a conductive layer (not shown, such as a common electrode layer) may be provided between the insulating layer 102 and the alignment layer 103, and an insulating layer (not shown) may be disposed between the common electrode layer and the alignment layer 103, but the disclosure is not limited thereto. In addition, according to different requirements, any one of the second substrate 11 and the first substrate 10 may further include one or more other film layers.

As shown in FIG. 2, the polarizing element 13 may be directly attached to the outer surface S1 of the first substrate 10 through the adhesive layer 130 of the polarizing element 13. In other words, the adhesive layer 130 may directly contact the outer surface S1 of the first substrate 10.

In some embodiments, the adhesive layer 130 of the polarizing element 13 may adopt an antistatic pressure sensitive adhesive (AS-PSA). In addition, a sheet resistance of the adhesive layer 130 may be designed to a low resistance. For example, the sheet resistance of the adhesive layer 130 may be within a range of $1\times10^{8}\Omega/\square$ to $1\times10^{12}\Omega/\square$, for example, within a range of $1\times10^{8}\Omega/\square$ to $1\times10^{11}\Omega/\square$, within a range of $1\times10^{8}\Omega/\square$ to $1\times10^{10}\Omega/\square$. In this way, the adhesive layer 130 may further provide electrostatic protection for the components below it (such as the second substrate 11, the first substrate 10 and the medium layer 12), and the light control module 1 does not need to provide an additional layer of antistatic transparent conductive layer between the polarizing element 13 and the first substrate 10, which helps to improve a transmittance of the light control module 1 and reduce a risk of underexposure. "$\Omega/\square$" refers to the number of ohms per unit area.

In some embodiments, the polarizing element 13 may further include a support layer (or passivation layer) 131, a polarizing layer 132, and a support layer 133 (or passivation layer). The support layer 131, the polarizing layer 132 and the support layer 133 are sequentially stacked on the adhesive layer 130 in the direction D3.

In some embodiments, a material of the support layer 131 and the support layer 133 may be selected from a non-UV cut material, so as to improve the transmittance of the polarizing element 13 for ultraviolet light. The ultraviolet light referred to herein may have a wavelength range between 100 nm and 420 nm, for example, between 300 nm and 420 nm, between 350 nm and 410 nm, between 390 nm and 405 nm. According to some embodiments, a transmittance of the suitable polarizing element 13 for a light beam with a wavelength of 405 nm may be greater than or equal to 32% and less than or equal to 50%, for example, greater than or equal to 32% and less than or equal to 40%, but the disclosure is not limited thereto. According to some embodiments, the transmittance of the suitable support layer 131 and the support layer 133 for the light beam with the wavelength of 405 nm may be greater than or equal to 32% and less than or equal to 50%, for example, greater than or equal to 32% and less than or equal to 40%, but the disclosure is not limited thereto. Materials of the support layer 131 and the support layer 133 include, for example, cellulose triacetate (TAC), but the disclosure is not limited thereto.

In some embodiments, a material of the polarizing layer 132 may be selected from a material with a higher polarization degree to ultraviolet light, so as to increase the polarization degree of the polarizing element 13 to ultraviolet light. According to some embodiments, the polarization degree of the suitable polarizing element 13 for the light beam with the wavelength of 405 nm is greater than or equal to 99.8% and less than or equal to 100%. The material of the polarizing layer 132 includes, for example, polyvinyl alcohol (PVA), but the disclosure is not limited thereto. According to some embodiments, the polarization degree of the suitable polarizing layer 132 for the light beam with the wavelength of 405 nm is greater than or equal to 98% and less than or equal to 100%, for example, greater than or equal to 99.5% and less than or equal to 100%, greater than or equal to 99.8% and less than or equal to 100%. The transmittance and polarization degree of the polarizing element 13 may be measured by a spectrophotometer (such as JASCO V-7100), but the disclosure is not limited thereto.

In some embodiments, viewed from the top view of the light control module 1, as shown in FIG. 1, the polarizing element 13 may at least cover an active region (not indicated; such as a region where the element array is located) of the second substrate 11. In addition, an area of the first substrate 10 may be slightly larger than an area of the polarizing element 13 to facilitate arrangement of peripheral circuits or other elements (such as the electrical connection element 14). In addition, an area of the second substrate 11 may be larger than the area of the first substrate 10 to facilitate the arrangement of peripheral circuits or other elements (such as a first ground element and a second ground element 16).

As shown in FIG. 2, according to some embodiments, the electrical connection element 14 is electrically connected to the adhesive layer 130 of the polarizing element 13, so as to discharge static electricity at the adhesive layer 130. A material of the electrical connection element 14 includes, for example, conductive materials such as silver paste, copper paste, silver paste, nano-copper, other conductive materials, or combinations thereof, but the disclosure is not limited thereto.

In some embodiments, as shown in FIG. 1, the electrical connection element 14 may include an extending portion 140 and two bridge portions 141. The extending portion 140 is disposed on the outer surface S1 of the first substrate 10 and connected to the adhesive layer 130. For example, the extending portion 140 may be connected to a side wall S130 of the adhesive layer 130, and the extending portion 140, for example, extends in the direction D1. The two bridge portions 141 may be respectively located at a first end E1 and a second end E2 of the electrical connection element 14 and connected to the extending portion 140. For example, each bridge portion 141, for example, extends from the outer surface S1 of the first substrate 10 to the second substrate 11 along the side wall SS of the first substrate 10.

As shown in FIG. 1 and FIG. 2, in some embodiments, the light control module 1 may further include the first ground element 15 and the second ground element 16. The first ground element 15 and the second ground element 16 may be disposed on the second substrate 11 and respectively connected to the first end E1 and the second end E2 of the electrical connection element 14. For example, at least a part of the first ground element 15 and at least a part of the second ground element 16 may be respectively covered by the two bridge portions 141 of the electrical connection element 14.

In some embodiments, the light control module 1 may further include a polarizing element 17, and the second substrate 11 may be disposed between the polarizing element 17 and the medium layer 12. Similar to the polarizing element 13, the polarizing element 17 may also include an adhesive layer, a support layer, a polarizing layer, and a support layer sequentially stacked on the second substrate 11 along the direction opposite to the direction D3. For details of the above film layers, reference may be made to descriptions of the corresponding film layers of the polarizing element 13, which will not be repeated here. According to some embodiments, the adhesive layer included in the polarizing element 17 may be different from the adhesive layer included in the polarizing element 13, for example, a sheet resistance of the adhesive layer included in the polarizing element 17 may be greater than a sheet resistance of the adhesive layer included in the polarizing element 13. For example, the sheet resistance of the adhesive layer included in the polarizing element 17 may be between $1\times10^{11}\Omega/\square$ and $1\times10^{14}\Omega/\square$, for example, between $2\times10^{11}\Omega/\square$ and $1\times10^{13}\Omega/\square$. According to some embodiments, the adhesive layer included in the polarizing element 17 may be the same as the adhesive layer included in the polarizing element 13.

Referring to FIG. 4, a main difference between a light control module 1A and the light control module 1 of FIG. 1 is that the first ground element 15 and the second ground element 16 are respectively connected to a first part P1 and a second part P2 of an electrical connection element 14A, where the first part P1 and the second part P2 are separated from each other.

The first part P1 and the second part P2 may respectively include an extending portion 140 and a bridge portion 141. In some embodiments, a length of each extending portion 140 in contact with the polarizing element 13 (such as the maximum length L140 of the extending portion 140 in the direction D1) may be greater than 8% of a length L13 of the polarizing element 13, for example, a proportion of the maximum length L140 and the length L13 may be between 10% and 45%, between 15% and 40%, and between 20% and 40%, so as to facilitate the discharge of static electricity, but the disclosure is not limited thereto. The lengths of the two extending portions 140 may be the same or different, which is not limited by the disclosure.

Referring to FIG. 5A to FIG. 8, a 3D printing device 3DP may include the light control module 1 in FIG. 1 (or the light control module 1A in FIG. 4), the light source module 2 and the accommodating tank 3, where the light control module 1 is disposed between the light source module 2 and the accommodating tank 3. The light source module 2 is configured to provide a light beam B to the light control module 1. The accommodating tank 3 is configured to accommodate a light-curable material 4, and the light-curable material 4 is cured by the light beam B (uncured and cured light-curable materials are marked with different meshes in FIG. 5A, FIG. 6A and FIG. 7A for easy identification).

In some embodiments, the light source module 2 is, for example, an ultraviolet light source module, and a wavelength range of the light beam B may be, for example, between 100 nm and 420 nm, for example, between 300 nm and 420 nm, between 350 nm and 410 nm, between 390 nm and 405 nm, but the disclosure is not limited thereto. The light-curable material 4 is, for example, a liquid resin, and the liquid resin is cured to form a cured layer 4' after being irradiated by the light beam B.

An operation method of the 3D printing device 3DP may include: providing the 3D printing device 3DP; configuring the light-curable material 4 in the accommodating tank 3; enabling the light source module 2 to provide the light beam B; enabling the light control module 1 to provide a first light-transmitting region RT1 and a first light-blocking region RB1; enabling the light beam B to pass through the first light-transmitting region RT1 of the light control module 1; and curing a first part of the light-curable material 4 corresponding to the first light-transmitting region RT1 into a first cured layer 4-1 by the light beam B, as shown in FIG. 5A.

In some embodiments, the operation method of the 3D printing device 3DP may further include: enabling the light control module 1 to provide a second light-transmitting region RT2 and a second light-blocking region RB2; enabling the light beam B to pass through the second light-transmitting region RT2 of the light control module 1; and curing a second part of the light-curable material 4 corresponding to the second light-transmitting region RT2 into a second cured layer 4-2 by the light beam B, and stacking the second cured layer 4-2 on the first cured layer 4-1, as shown in FIG. 6A.

In some embodiments, the operation method of the 3D printing device 3DP may further include: enabling the light control module 1 to provide a third light-transmitting region RT3 and a third light-blocking region RB3; enabling the light beam B to pass through the third light-transmitting region RT3 of the light control module 1; and curing a third part of the light-curable material 4 corresponding to the third light-transmitting region RT3 into a third cured layer 4-3 by the light beam B, and stacking the third cured layer 4-3 on the second cured layer 4-2, as shown in FIG. 7A.

In detail, taking 3D printing of an apple 6 (referring to FIG. 8) as an example, a carrier used for carrying a 3D printed item (the apple 6) may be placed in the unilluminated light-curable material 4. Then, a size of the light-transmitting region/light-blocking region in the light control module 1 that allows the light beam B to pass through is electronically adjusted, so as to cure the liquid light-curable material 4 in the accommodating tank 3 that is overlapped with the light-transmitting region and located under the carrier 5 (to form the cured layer 4'). Specifically, the light control module 1 includes multiple pixel electrodes (such as the pixel electrode PE in FIG. 3), and by adjusting voltages of the pixel electrodes in different regions of multiple pixel electrodes, the light control module 1 may provide the light-transmitting regions (such as the first light-transmitting region RT1, the second light-transmitting region RT2, and the third light-transmitting region RT3) and the light-blocking regions (such as the first light-blocking region RB1, the second light-blocking region RB2, and the third light-blocking region RB3). For example, by controlling a voltage difference between the pixel electrode PE and the common electrode layer (such as the conductive layer 119) in FIG. 3 to control a state of liquid crystal molecules in each pixel region, a light-transmitting amount of each pixel region in the light control module 1 may be independently controlled. For example, multiple pixel regions in a middle region of the light control module 1 may be controlled to present a white image (light-transmitting state), while multiple pixel region in a peripheral region present a black image (light-blocking state), where the more the number of pixel regions presenting the white image is, the larger the light-transmitting region is; conversely, the more the number of pixel regions presenting the black image is, the smaller the light-transmitting region is.

After forming the cured layer 4', if manufacturing of the apple 6 has not been completed, the carrier 5 may be lifted for a distance, and the distance is equal to a thickness of the cured layer 4' to be formed in the subsequent curing step. After multiple curing steps, the cured layers 4' may be stacked into a 3D pattern. After manufacturing of the apple 6 is completed, the curing procedure may be terminated, and the apple 6 may be separated from the carrier 5 to obtain the apple 6 as shown in FIG. 8.

In summary, in an embodiment of the disclosure, the light control module includes the polarizing element disposed on the outer surface of the first substrate, and the adhesive layer in the polarizing element is connected to the electrical connection element. According to some embodiments, the adhesive layer may have an antistatic property, such that the adhesive layer may provide electrostatic protection. According to some embodiments, the light control module does not need to additionally provide an antistatic transparent conductive layer between the polarizing element and the first substrate. According to some embodiments, by using the light control module to the 3D printing device, it helps to increase the transmittance of the light control module, reduce the risk of underexposure, and achieve a good 3D printing effect.

The above embodiments are only used to illustrate the technical solutions of the disclosure, rather than to limit them; although the disclosure has been described in detail with reference to the foregoing embodiments, those skilled in the art should understand that: it is still possible to modify the technical solutions described in the foregoing embodiments, or perform equivalent replacements for some or all of the technical features; and these modifications or replacements do not make the essence of the corresponding technical solutions deviate from the scope of the technical solutions of the embodiments disclosed in this disclosure.

Although the embodiments and advantages of the embodiments of the disclosure have been disclosed as above, it should be understood that anyone with ordinary knowledge in the technical field may make changes, substitutions, and decorations without departing from the spirit and scope of the disclosure. Moreover, a protection scope of the disclosure is not limited to the devices, methods, and steps of the specific embodiments described in the specification, and anyone with ordinary knowledge in the technical field may understand the present or future developed devices, methods and steps from the content disclosed in the disclosure, which may all be used according to the disclosure as long as the substantially same functions may be implemented or the substantially same results may be obtained in the embodiments described herein. Therefore, the protection scope of the disclosure includes the above devices, methods, and steps. In addition, each claim constitutes an individual embodiment, and the protection scope of the disclosure also includes a combination of each claim and the embodiment. The protection scope of the disclosure is defined by the appended claims.

What is claimed is:

1. A three-dimensional printing device, comprising:

a light control module;

a light source module, configured to provide a light beam to the light control module; and an accommodating tank, configured to accommodate a light-curable material, wherein the light control module is disposed between the light source module and the accommodating tank, and the light-curable material is cured by the light beam, wherein the light control module comprises:

a first substrate, having an outer surface, an inner surface opposite to the outer surface and a side wall connected between the outer surface and the inner surface of the first substrate;

a second substrate, opposite to the first substrate;

a medium layer, disposed between the inner surface of the first substrate and the second substrate;

a polarizing element, disposed on a first portion of the outer surface of the first substrate and comprising an adhesive layer;

an electrical connection element, at least partially disposed on the outer surface of the first substrate and connected to the adhesive layer; and a first ground element and a second ground element disposed on the second substrate, wherein in a top view, the first ground element and the second ground element are disposed along a first direction, wherein the electrical connection element comprises an extending portion extending along the first direction, the first ground element is connected to a first end of the extending portion, and the second ground element is connected to a second end of the extending portion, wherein the electrical connection element is in contact with the side wall of the first substrate and in contact with a second portion of the outer surface of the first substrate.

2. The three-dimensional printing device according to claim 1, wherein a wavelength range of the light beam is between 300 nm and 420 nm.

3. The three-dimensional printing device according to claim 1, wherein a sheet resistance of the adhesive layer is within a range of $1\times10^{8}\Omega/\square$ to $1\times10^{12}\Omega/\square$.

4. The three-dimensional printing device according to claim 1, wherein the adhesive layer is in direct contact with the first portion of the outer surface of the first substrate.

5. The three-dimensional printing device according to claim 1, wherein transmittance of the polarizing element at 405 nm to the light beam is greater than or equal to 32% and less than or equal to 50%.

6. The three-dimensional printing device according to claim 1, wherein polarization degree of the polarizing element at 405 nm to the light beam is greater than or equal to 98% and less than or equal to 100%.

7. The three-dimensional printing device according to claim 1, wherein the medium layer comprises a liquid crystal layer.

8. The three-dimensional printing device according to claim 1, wherein an orthogonal projection of the side wall of the first substrate on an outer surface of the second substrate is disposed between an orthogonal projection of a side wall of the adhesive layer on the outer surface of the second substrate and a side wall of the second substrate.

9. A light control module, comprising:

a first substrate, having an outer surface, an inner surface opposite to the outer surface and a side wall connected between the outer surface and the inner surface of the first substrate;

a second substrate, opposite to the first substrate;

a medium layer, disposed between the inner surface of the first substrate and the second substrate;

a polarizing element, disposed on a first portion of the outer surface of the first substrate and comprising an adhesive layer;

an electrical connection element, at least partially disposed on the outer surface of the first substrate and connected to the adhesive layer; and a first ground element and a second ground element disposed on the second substrate, wherein in a top view, the first ground element and the second ground element are disposed along a first direction, wherein the electrical connection element comprises an extending portion extending along the first direction, the first ground element is connected to a first end of the extending portion, and the second ground element is connected to a second end of the extending portion, wherein the electrical connection element is in contact with the side wall of the first substrate and in contact with a second portion of the outer surface of the first substrate.

10. The light control module according to claim 9, wherein a sheet resistance of the adhesive layer is within a range of $1\times10^{8}\Omega/\square$ to $1\times10^{12}\Omega/\square$.

11. The light control module according to claim 9, wherein the adhesive layer is in direct contact with the first portion of the outer surface of the first substrate.

12. The light control module according to claim 9, wherein transmittance of the polarizing element at 405 nm to a light beam is greater than or equal to 32% and less than or equal to 50%.

13. The light control module according to claim 9, wherein polarization degree of the polarizing element at 405 nm to a light beam is greater than or equal to 98% and less than or equal to 100%.

14. The light control module according to claim 9, wherein an orthogonal projection of the side wall of the first substrate on an outer surface of the second substrate is disposed between an orthogonal projection of a side wall of the adhesive layer on the outer surface of the second substrate and a side wall of the second substrate.

15. An operation method of a three-dimensional printing device, comprising:

providing the three-dimensional printing device, wherein the three-dimensional printing device comprises a light control module, a light source module, and an accommodating tank, wherein the light control module comprises a first substrate, a second substrate, a medium layer, a polarizing element, an electrical connection element, a first ground element and a second ground element, and the first substrate has an outer surface, an inner surface opposite to the outer surface and a side wall connected between the outer surface and the inner surface of the first substrate, the second substrate is disposed opposite to the first substrate, and the medium layer is disposed between the inner surface of the first substrate and the second substrate, the polarizing element is disposed on a first portion of the outer surface of the first substrate and comprises an adhesive layer, and the electrical connection element is at least partially disposed on the outer surface of the first substrate and is connected to the adhesive layer, the first ground element and the second ground element are disposed on the second substrate, wherein in a top view, the first ground element and the second ground element are disposed along a first direction, wherein the electrical connection element comprises an extending portion extending along the first direction, the first ground element is connected to a first end of the extending portion, and wherein the electrical connection element is in contact with the side wall of the first substrate and in contact with a second portion of the outer surface of the first substrate;

configuring a light-curable material in the accommodating tank;

enabling the light source module to provide a light beam;

enabling the light control module to provide a first light-transmitting region and a first light-blocking region;

enabling the light beam to pass through the first light-transmitting region of the light control module; and curing a first part of the light-curable material corresponding to the first light-transmitting region into a first cured layer by the light beam.

16. The operation method of the three-dimensional printing device according to claim 15, further comprising:

enabling the light control module to provide a second light-transmitting region and a second light-blocking region;

enabling the light beam to pass through the second light-transmitting region of the light control module; and curing a second part of the light-curable material corresponding to the second light-transmitting region into a second cured layer by the light beam, and stacking the second cured layer on the first cured layer.

17. The operation method of the three-dimensional printing device according to claim 15, wherein the light control module comprises a plurality of pixel electrodes, the operation method further comprises: making the light control module to provide the first light-transmitting region and the first light-blocking region by adjusting voltages of the pixel electrodes in different regions of the pixel electrodes.

18. The operation method of the three-dimensional printing device according to claim 17, wherein the first light-transmitting region of the light control module presents a white image, and the first light-blocking region presents a black image.

19. The operation method of the three-dimensional printing device according to claim 15, wherein a wavelength range of the light beam is between 300 nm and 420 nm.

20. The operation method of the three-dimensional printing device according to claim 15, wherein the medium layer comprises a liquid crystal layer.

* * * * *